(12) United States Patent
Kim et al.

(10) Patent No.: US 9,473,971 B2
(45) Date of Patent: Oct. 18, 2016

(54) METHOD AND APPARATUS FOR MANAGING QOS GROUP IN WIRELESS COMMUNICATION SYSTEM

(71) Applicant: LG ELECTRONICS INC., Seoul (KR)

(72) Inventors: Hyunsook Kim, Anyang-si (KR); Jaehyun Kim, Anyang-si (KR); Laeyoung Kim, Anyang-si (KR); Taehyeon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 118 days.

(21) Appl. No.: 14/382,805

(22) PCT Filed: Mar. 21, 2013

(86) PCT No.: PCT/KR2013/002349
§ 371 (c)(1),
(2) Date: Sep. 4, 2014

(87) PCT Pub. No.: WO2013/141625
PCT Pub. Date: Sep. 26, 2013

(65) Prior Publication Data
US 2015/0049610 A1    Feb. 19, 2015

Related U.S. Application Data

(60) Provisional application No. 61/613,943, filed on Mar. 21, 2012, provisional application No. 61/662,316, filed on Jun. 20, 2012.

(51) Int. Cl.
*H04W 28/02* (2009.01)
*H04W 4/00* (2009.01)
(Continued)

(52) U.S. Cl.
CPC .......... *H04W 28/0215* (2013.01); *H04L 47/32* (2013.01); *H04L 67/12* (2013.01); *H04W 4/005* (2013.01); *H04W 28/24* (2013.01); *H04W 4/08* (2013.01)

(58) Field of Classification Search
CPC .............. H04W 4/005; H04W 28/24; H04W 28/0215; H04W 4/08; H04W 28/22; H04W 76/02; H04W 8/186; H04W 28/0268; H04W 28/16; H04W 52/26; H04W 52/265; H04W 4/006; H04L 67/12; H04L 47/32; H04L 67/306; H04L 5/0091; H04L 63/10; H04L 63/104
See application file for complete search history.

(56) References Cited

U.S. PATENT DOCUMENTS

2010/0046369 A1    2/2010 Zhao et al.
2011/0310737 A1*  12/2011 Klingenbrunn ... H04W 36/0044
                                                            370/235

(Continued)

FOREIGN PATENT DOCUMENTS

WO    WO 2008/136489 A1    11/2008
WO    WO 2010/142335 A1    12/2010

(Continued)

*Primary Examiner* — Charles C Jiang
*Assistant Examiner* — Rose Clark
(74) *Attorney, Agent, or Firm* — Birch, Stewart, Kolasch & Birch, LLP

(57) ABSTRACT

The present invention relates to a wireless communication system and, more particularly, to a method for managing the quality of service (QOS) of a network node in a wireless communication system, comprising a step of confirming a maximum bit rate (MBR) of user plane data of a terminal, wherein the confirming step further comprises the steps of: calculating the total MBR for a machine type communications (MTC) group to which the terminal belongs; and comparing the calculated value with an aggregated MBR (AMBR) group when the terminal belongs to the MTC group.

8 Claims, 12 Drawing Sheets

(51) Int. Cl.
  *H04W 28/24*    (2009.01)
  *H04L 12/823*   (2013.01)
  *H04L 29/08*    (2006.01)
  *H04W 4/08*     (2009.01)

(56) References Cited

U.S. PATENT DOCUMENTS

2012/0179790 A1    7/2012  Kim et al.
2012/0189016 A1*   7/2012  Bakker ............... H04W 76/021
                                              370/401
2012/0209978 A1*   8/2012  Cho .................... H04W 60/04
                                              709/223
2012/0246325 A1*   9/2012  Pancorbo
                           Marcos ............... H04L 12/2602
                                              709/227
2013/0051231 A1*   2/2013  Cai .................... H04W 28/22
                                              370/230

FOREIGN PATENT DOCUMENTS

WO    WO 2011/013988 A2    2/2011
WO    WO 2011/137564 A1   11/2011

* cited by examiner (a)

(b)

(a)

(b)

METHOD AND APPARATUS FOR MANAGING QOS GROUP IN WIRELESS COMMUNICATION SYSTEM

CROSS REFERENCE TO RELATED APPLICATIONS

This application is the National Phase of PCT/KR2013/002349 filed on Mar. 21, 2013, which claims priority under 35 U.S.C. 119(e) to U.S. Provisional Application Nos. 61/613,943 filed on Mar. 21, 2012; 61/662,316 filed on Jun. 20, 2012, all of which are hereby expressly incorporated by reference into the present application.

TECHNICAL FIELD

The present invention relates to a wireless communication system and, more particularly, to a method and apparatus for managing group Quality of Service (QoS).

BACKGROUND ART

Machine Type Communication (MTC) refers to a communication scheme using one or more machines, and may also be referred to as Machine-to-Machine (M2M) communication. Here, a machine may be an entity that does not require direct manipulation or intervention of a user. For example, not only a device, e.g., a meter or a vending machine, including a mobile communication module but also a User Equipment (UE), e.g., a smartphone, capable of automatically accessing a network without user manipulation or intervention to perform communication may be machines. These machines are referred to as MTC devices or UEs in the present specification. That is, MTC refers to communication performed by one or more machines (i.e., MTC devices) without user manipulation or intervention.

MTC may include communication between MTC devices (e.g., Device-to-Device (D2D) communication) and communication between an MTC device and an MTC application server. Examples of communication between an MTC device and an MTC application server include communication between a vending machine and a server, communication between a Point of Sale (POS) device and a server, and communication between an electricity meter, a gas meter or a water meter and a server. In addition, MTC-based applications may include, for example, security, transportation, and healthcare applications.

DISCLOSURE

Technical Problem

An object of the present invention devised to solve the problem lies in a method for managing Quality of Service (QoS) and, more particularly, Aggregate Maximum Bit Rate (AMBR) of an MTC group.

It is to be understood that both the foregoing general description and the following detailed description of the present invention are exemplary and explanatory and are intended to provide further explanation of the invention as claimed.

Technical Solution

The object of the present invention can be achieved by providing a method for managing Quality of Service (QoS) of a network node in a wireless communication system, the method including checking a Maximum Bit Rate (MBR) of user plane data of a User Equipment (UE), wherein, if the UE belongs to a Machine Type Communication (MTC) group, the checking further includes calculating a total MBR of the MTC group including the UE, and comparing the calculated value to a group Aggregated MBR (AMBR).

In another aspect of the present invention, provided herein is a network node apparatus for managing a Maximum Bit Rate (MBR) in a wireless communication system, the apparatus including a transceiver module and a processor, wherein the processor is configured to check an MBR of user plane data of a User Equipment (UE), and wherein, if the UE belongs to a Machine Type Communication (MTC) group, the checking further includes calculating a total MBR of the MTC group including the UE, and comparing the calculated value to a group Aggregated MBR (AMBR).

The followings may be commonly applied to the method and the apparatus.

When a number of UEs belonging to the MTC group is changed, a total QoS parameter value usable by the group associated with the UE may be updated.

The updating of the QoS parameter value may include changing the group AMBR.

The MBR of each UE belonging to the MTC group may be constantly maintained even when the group AMBR is changed.

If the change in number of UEs is less than a pre-configured value, the group AMBR may be constantly maintained when the QoS parameter value is updated.

The updating of the QoS parameter value may include changing MBRs of only some of the UEs belonging to the MTC group.

If the calculated value is greater than the group AMBR, the network node may drop packets of the user plane data.

The group AMBR may be received from a Mobility Management Entity (MME), pre-configured in the network node, or received from a Policy and Charging Rules Function (PCRF).

If the network node is for one of two paths for the user plane data, the group AMBR may be one of two virtual group AMBRs for the group AMBR of subscriber information.

The two paths may include a path for a Selected IP Traffic Offload at Local Network (SIPTO@LN).

The two virtual group AMBRs may be pre-configured.

The group AMBR may be an AMBR for all Packet Data Network (PDN) connections of UEs belonging to the MTC group.

The network node may be a Packet data network GateWay (PGW).

Advantageous Effects

According to the present invention, QoS and, more particularly, AMBR may be efficiently managed on a specific group basis in an MTC service environment. In addition, the burden of using network signaling and resources when a plurality of UEs are added to or deleted from a group may be reduced through group-based QoS adjustment.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
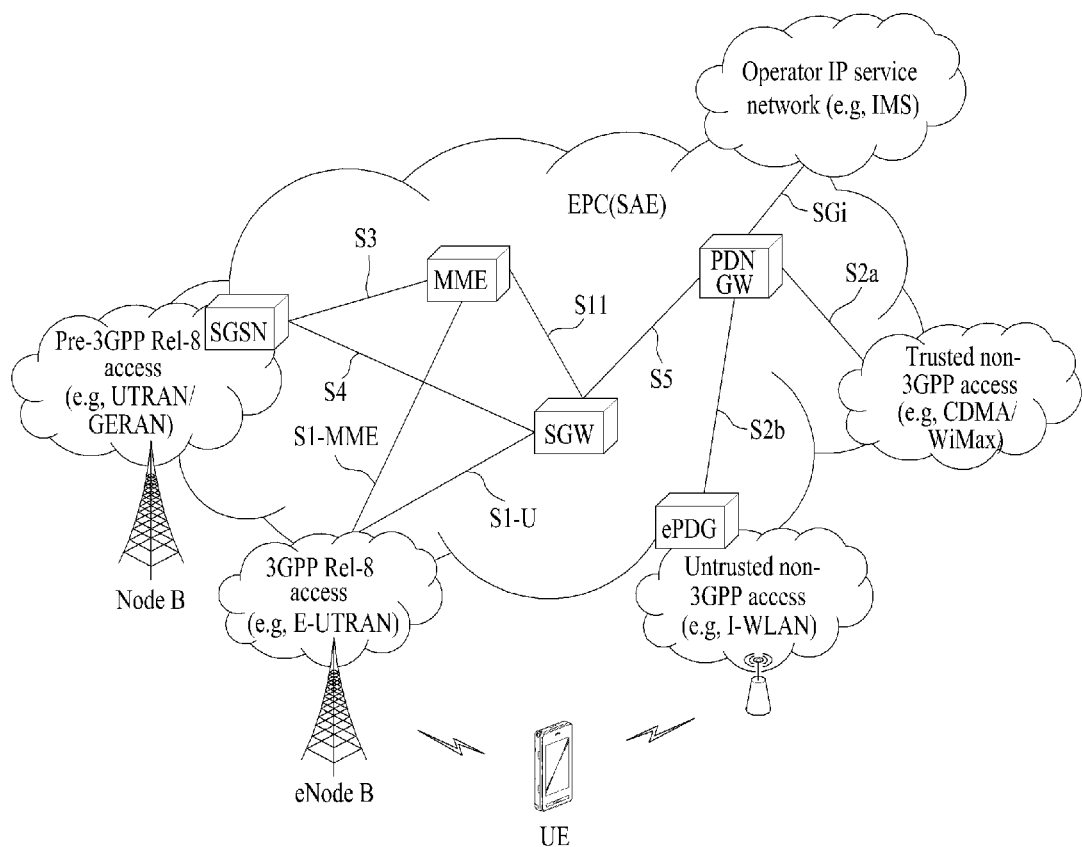
FIG. 1 is a view schematically illustrating the architecture of an Evolved Packet System (EPS) including an Evolved Packet Core (EPC)

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, to prevent the concept of the present invention from being ambiguous, structures and apparatuses of the known art will be omitted, or will be shown in the form of block diagram based on main functions of each structure and apparatus. Also, wherever possible, like reference numerals denote the same parts throughout the drawings and the specification.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those specifications. Further, all terms as set forth herein can be explained by the standard specifications.

Techniques described herein can be used in various wireless access systems. For clarity, the present disclosure focuses on 3GPP LTE and LTE-A systems. However, the technical features of the present invention are not limited thereto.

Terms used in the following description are defined as follows.

UMTS (Universal Mobile Telecommunication System): $3^{rd}$ generation mobile communication technology based on a Global System for Mobile Communication (GSM) developed by 3GPP.

EPS (Evolved Packet System): Network system including an Evolved Packet Core (EPC) which is a Packet Switched (PS) core network based on Internet Protocol (IP) and an access network such as LTE or UMTS Terrestrial Radio Access Network (UTRAN), which is evolved from UMTS.

NodeB: Base station of a GSM (Global System for Mobile Communication)/EDGE (Enhanced Data rates for Global Evolution) Radio Access Network (GERAN)/UTRAN, which is installed outdoors and has a coverage corresponding to a macro cell.

eNB (eNodeB): Base station of an LTE network, which is installed outdoors and has a coverage corresponding to a macro cell.

UE (User Equipment): UE can also be referred to as a terminal, a Mobile Equipment (ME), a Mobile Station (MS) or the like. In addition, the UE can be a portable device such as a laptop computer, a mobile phone, a Personal Digital Assistant (PDA), a smartphone or a multimedia device, or a non-portable device such as a Personal Computer (PC) or a vehicle-mounted device.

RAN (Radio Access Network): Unit including a NodeB, an eNodeB and a Radio Network Controller (RNC) for controlling the NodeB and the eNodeB in a 3GPP network, which is present between UEs and a core network and provides a connection to the core network.

HLR (Home Location Register)/HSS (Home Subscriber Server): Database having subscriber information in a 3GPP network. The HSS can perform functions such as configuration storage, identity management and user state storage.

RANAP (RAN Application Part): Interface between nodes (e.g., Mobility Management Entity (MME)/Serving GPRS (General Packet Radio Service) Support Node (SGSN)/Mobile Switching Center (MSC)) configured to control a RAN and a core network.

PLMN (Public Land Mobile Network): Network configured for the purpose of providing mobile communication services to individuals. This network can be configured per operator.

NAS (Non-Access Stratum): Functional layer for signaling and exchanging traffic messages between a UE and a core network in a UMTS protocol stack. Major functions thereof are to support UE mobility and to support a session management procedure for establishing and maintaining an IP connection between a UE and a Packet Data Network Gateway (PDN GW).

HNB (Home NodeB): Customer Premises Equipment (CPE) for providing UTRAN coverage. For details thereof, reference can be made to 3GPP TS 25.467.

HeNodeB (Home eNodeB): CPE for providing Evolved-UTRAN (E-UTRAN) coverage. For details thereof, reference can be made to 3GPP TS 36.300.

CSG (Closed Subscriber Group): Group of subscribers who are permitted to access one or more CSG cells of a Public Land Mobile Network (PLMN) as members of a CSG of a H(e)NB.

CSG ID: Unique identifier for identifying a CSG within a range of PLMN associated with a CSG cell or a CSG cell group. For details thereof, reference can be made to 3GPP TS 23.003.

LIPA (Local IP Access): Access of an IP capable UE via a H(e)NB to another IP capable entity within the same residential/enterprise IP network. LIPA traffic does not traverse a mobile operator's network. 3GPP Rel-10 feature providing access to resources on the Local Network (LN) (e.g., the network located inside the customer's home or enterprise premises) via a H(e)NB.

MRA (Managed Remote Access): Access of a CSG member to an IP capable entity connected to a home based network from outside the home based network. For example, a user located outside a local network can receive user data services from the local network using MRA.

SIPTO (Selected IP Traffic Offload): 3GPP Rel-10 feature allowing the operator to offload of user's traffic by selecting a Packet data network GateWay (PGW) residing close to the Evolved Packet Core (EPC) network edge.

SIPTO@LN (SIPTO at Local Network): SIPTO@LN is an enhancement of the Rel-10 SIPTO feature and allows the operator to offload user's traffic via the Local Network (LN) inside the customer's premises. In contrast to Rel-10 LIPA, whose aim is to provide access to resources on the local network itself, the SIPTO@LN feature aims at providing access to external networks (e.g., Internet) via the local network (the underlying assumption being that the Local Network eventually has connectivity towards the desired external network).

PDN (Packet Data Network) Connection: Logical connection between a UE indicated by a single IP address (e.g., single IPv4 address and/or single IPv6 prefix) and a PDN indicated by an Access Point Name (APN).

LIPA PDN connection: PDN connection for LIPA of a UE connected to a H(e)NB.

LIPA-Permission: This indicates whether an APN is accessible through LIPA and the following three values are defined.

LIPA-Prohibited: APN to which access through LIPA is prohibited. That is, user plane data can access such APN via an EPC only.

LIPA-Only: APN accessible only through LIPA.

LIPA-Conditional: APN accessible in a non-LIPA manner (i.e., via an EPC) and accessible through LIPA.

Hereinafter, a description will be given based on the above-defined terms.

EPC (Evolved Packet Core)

FIG. 1 is a view schematically illustrating the architecture of an Evolved Packet System (EPS) including an Evolved Packet Core (EPC).

The EPC is a fundamental element of System Architecture Evolution (SAE) for improving the performance of 3GPP technologies. SAE corresponds to a study item for determining a network architecture supporting mobility between various types of networks. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In the legacy mobile communication system (i.e., $2^{nd}$ Generation (2G) or $3^{rd}$ Generation (3G) mobile communication system), the function of a core network is implemented through two distinct sub-domains, e.g., a Circuit-Switched (CS) sub-domain for voice and a Packet-Switched (PS) sub-domain for data. In a 3GPP LTE system evolved from the 3G communication system, the CS and PS sub-domains are unified into a single IP domain. That is, in the 3GPP LTE system, a connection between UEs having IP capability can be established through an IP-based base station (e.g., evolved NodeB (eNodeB)), an EPC and an application domain (e.g., IP Multimedia Subsystem (IMS)). That is, the EPC is an architecture inevitably required to implement end-to-end IP services.

The EPC may include various components. FIG. 1 illustrates some of the components, e.g., Serving Gateway (SGW), Packet Data Network Gateway (PDN GW), Mobility Management Entity (MME), Serving GPRS (General Packet Radio Service) Supporting Node (SGSN) and enhanced Packet Data Gateway (ePDG).

The SGW operates as a boundary point between a Radio Access Network (RAN) and a core network and is an element functioning to maintain a data path between an eNodeB and a PDN GW. In addition, if a UE moves over a region served by an eNodeB, the SGW serves as a local mobility anchor point. That is, packets may be routed through the SGW for mobility in an Evolved-UMTS (Universal Mobile Telecommunications System) Terrestrial Radio Access Network (E-UTRAN) defined after 3GPP Rel-8. Further, the SGW may serve as an anchor point for mobility with another 3GPP network (a RAN defined before 3GPP Rel-8, e.g., UTRAN or GERAN.

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) network or WiMax network).

Although the SGW and the PDN GW are configured as separate gateways in the network architecture of FIG. 1, the two gateways may be implemented depending on a single gateway configuration option.

The MME performs signaling and control functions for supporting access for a network connection of a UE, allocation of network resources, tracking, paging, roaming and handover. The MME controls control plane functions related to subscriber and session management. The MME manages a large number of eNodeBs and performs signaling for selection of a conventional gateway for handover to another 2G/3G network. In addition, the MME performs security procedures, terminal-to-network session handling, idle terminal location management, etc.

The SGSN handles all packet data for mobility management of a user to another 3GPP network (e.g., GPRS network) and authentication of the user.

The ePDG serves as a security node for an untrusted non-3GPP network (e.g., I-WLAN or Wi-Fi hotspot).

As described above in relation to FIG. 1, a UE having IP capabilities may access an IP service network (e.g., IMS) provided by an operator via various elements in the EPC based on not only 3GPP access but also non-3GPP access.

FIG. 1 illustrates various reference points (e.g., S1-U and S1-MME). In the 3GPP system, a conceptual link for connecting two functions, which are present in different functional entities of E-UTRAN and EPC, is defined as a reference point. Table 1 shows the reference points illustrated in FIG. 1. Various reference points other than those of Table 1 may also be present depending on the network architecture.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunnelling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing related control and mobility support between the trusted non-3GPP access and the PDNGW to a user plane. S2b is a reference point for providing related control and mobility support between the ePDG and the PDN GW to the user plane.

Figure 2:
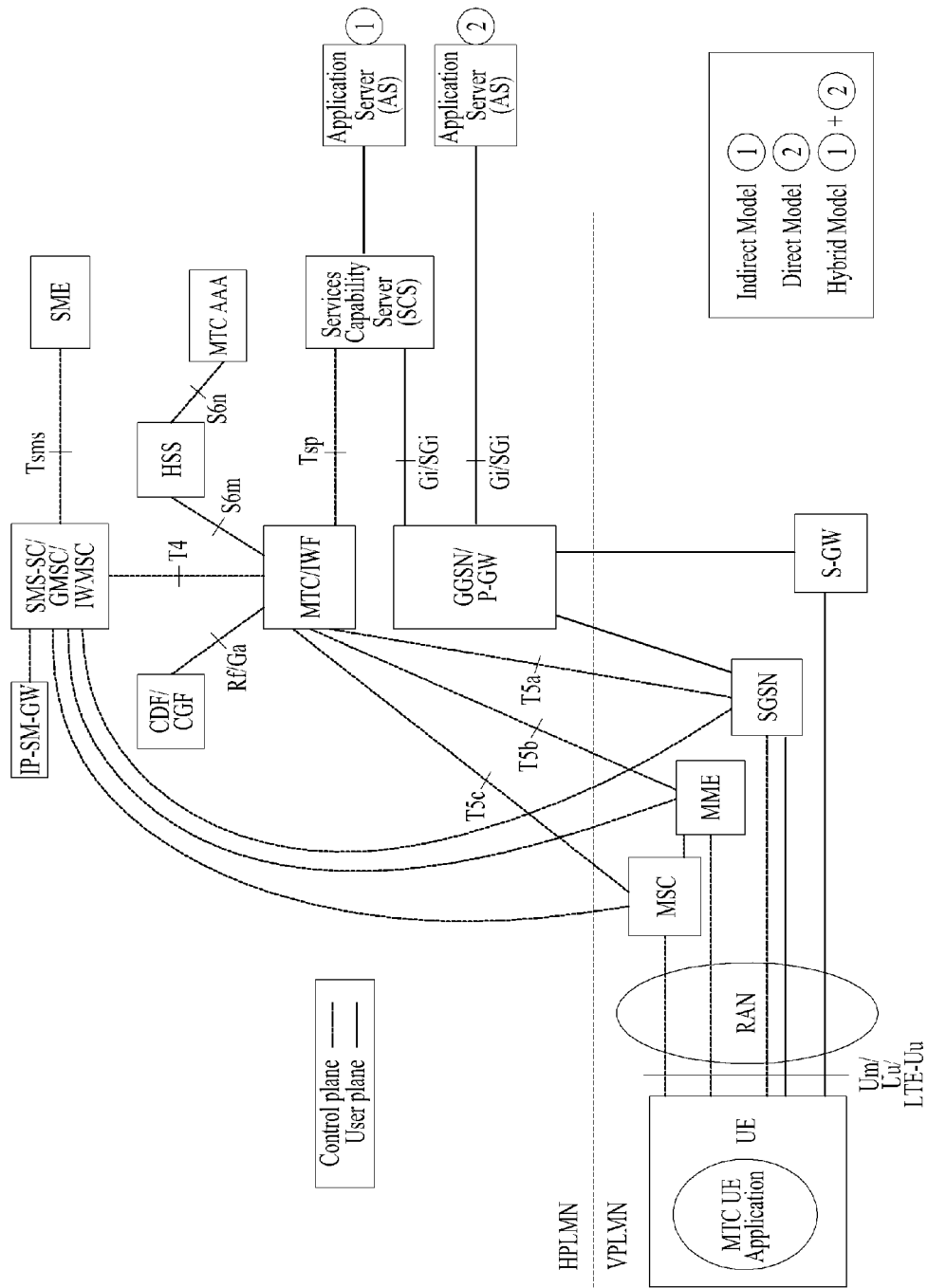
FIG. 2 is a view illustrating an exemplary model of a Machine Type Communication (MTC) architecture.

FIG. 2 is a view illustrating an exemplary model of an MTC architecture.

An end-to-end application between a UE (or an MTC UE) used for MTC and an MTC application may use services provided by a 3GPP system and selective services provided by an MTC server. The 3GPP system may provide transport and communication services (including 3GPP bearer service, IMS and SMS) including a variety of optimization services for facilitating MTC. In FIG. 2, the UE used for MTC is connected to a 3GPP network (e.g., UTRAN, E-UTRAN, GERAN or I-WLAN) through a Um/Uu/LTE-Uu interface. The architecture of FIG. 2 includes various MTC models (e.g., direct model, indirect model and hybrid model).

A description is now given of entities illustrated in FIG. 2.

In FIG. 2, an application server is a server for executing an MTC application on a network. The above-described various technologies for implementing MTC applications are applicable to an MTC application server and a detailed description thereof is omitted here. In addition, the MTC application server may access an MTC server through a reference point API and a detailed description thereof is omitted here. Alternatively, the MTC application server may be co-located with the MTC server.

An MTC server (e.g., SCS server in FIG. 2) is a server for managing MTC UEs on a network and may be connected to the 3GPP network to communicate with the UE used for MTC and nodes of PLMN.

An MTC-InterWorking Function (IWF) may control interworking between an MTC server and a core network of an operator and serve as a proxy for MTC operation. To support an MTC indirect or hybrid model, one or more MTC-IWFs may be present within a Home PLMN (HPLMN). The MTC-IWF may relay and analyze a signaling protocol on a reference point Tsp to operate a specific function in the PLMN. The MTC-IWF may perform a function for authenticating the MTC server before the MTC server establishes communication with the 3GPP network, a function for authenticating a control plane request from the MTC server, various functions related to trigger instructions to be described below, etc.

A Short Message Service-Service Center (SMS-SC)/Internet Protocol Short Message GateWay (IP-SM-GW) may manage transmission and reception of an SMS. The SMS-SC may serve to relay a short message between a Short Message Entity (SME) (i.e., an entity for transmitting or receiving a short message) and a mobile station and to store and deliver the short message. The IP-SM-GW may serve to perform protocol interworking between the UE and the SMS-SC based on IP.

A Charging Data Function (CDF)/Charging Gateway Function (CGF) may perform operations related to charging.

An HLR/HSS may serve to store and provide subscriber information (e.g., IMSI), routing information, configuration information, etc. to the MTC-IWF.

An MSC/SGSN/MME may perform control functions such as mobility management, authentication and resource allocation for a network connection of a UE. The MSC/SGSN/MME may receive a trigger instruction from the MTC-IWF in relation to triggering to be described below, and process the trigger instruction into the form of a message to be provided to the MTC UE.

A Gateway GPRS Support Node (GGSN)/Serving-Gateway (S-GW)+Packet Data Network-Gateway (P-GW) may serve as a gateway for connecting a core network and an external network.

Table 2 shows major reference points illustrated in FIG. 2.

TABLE 2

| Reference Point | Description |
| --- | --- |
| Tsms | It is the reference point an entity outside the 3GPP system uses to communicate with UEs used for MTC via SMS. |
| Tsp | It is the reference point an entity outside the 3GPP system uses to communicate with the MTC-IWF related control plane signalling. |
| T4 | Reference point used by MTC-IWF to route device trigger to the SMS-SC in the HPLMN. |
| T5a | Reference point used between MTC-IWF and serving SGSN. |
| T5b | Reference point used between MTC-IWF and serving MME. |
| T5c | Reference point used between MTC-IWF and serving MSC. |
| S6m | Reference point used by MTC-IWF to interrogate HSS/HLR for E.164 MSISDN or external identifier mapping to IMSI and gather UE reachability and configuration information. |

One or more reference points among T5a, T5b and T5c are referred to as T5.

User plane communication with an MTC server in case of the indirect and hybrid models, and communication with an MTC application server in case of the direct and hybrid models may be performed using a legacy protocol through reference points Gi and SGi.

The descriptions given above in relation to FIG. 2 can be incorporated by reference in this specification by referring to 3GPP TS 23.682.

In the case of MTC, more MTC UEs than normal UEs are expected to be present on a network. Accordingly, MTC is required to minimize use of network resources, signaling and power.

In addition, an MTC UE may not establish an IP connection to an MTC application server at ordinary times to minimize use of system resources. If the MTC UE does not establish an IP connection and thus the MTC application server fails to transmit data to the MTC UE, the MTC UE may be requested or instructed to establish an IP connection and this request or instruction is referred to as a trigger instruction. That is, triggering of the MTC UE is required if an IP address of the MTC UE is unavailable or unreachable by the MTC application server (a fact that a certain entity or an address of the entity is unreachable means that an attempt for message delivery fails because, for example, the entity is absent from the address). To this end, the MTC UE may receive a trigger instruction from the network. Upon receiving the trigger instruction, the MTC UE is required to perform operation of an MTC application embedded therein and/or to establish communication with the MTC application server. Here, when the MTC UE receives the trigger instruction, a) a case in which the MTC UE is offline (i.e., not attached to the network), b) a case in which the MTC UE is online (i.e., attached to the network) but a data connection is not established, or c) a case in which the MTC UE is online (i.e., attached to the network) and a data connection is established, may be assumed.

For example, when an IP connection (or PDN connection) through which the MTC UE can receive data from the MTC application server is not established (or when the MTC UE can receive basic control signals but cannot receive user data), triggering of the MTC UE may be an operation for allowing the MTC UE to perform operation of an MTC application embedded therein and/or to request the MTC application server for an IP connection using a trigger message. In addition, the trigger message may include information for allowing the network to route a message to an appropriate MTC UE and allowing the MTC UE to route the message to an appropriate application of the MTC UE (hereinafter referred to as trigger information).

Figure 3:
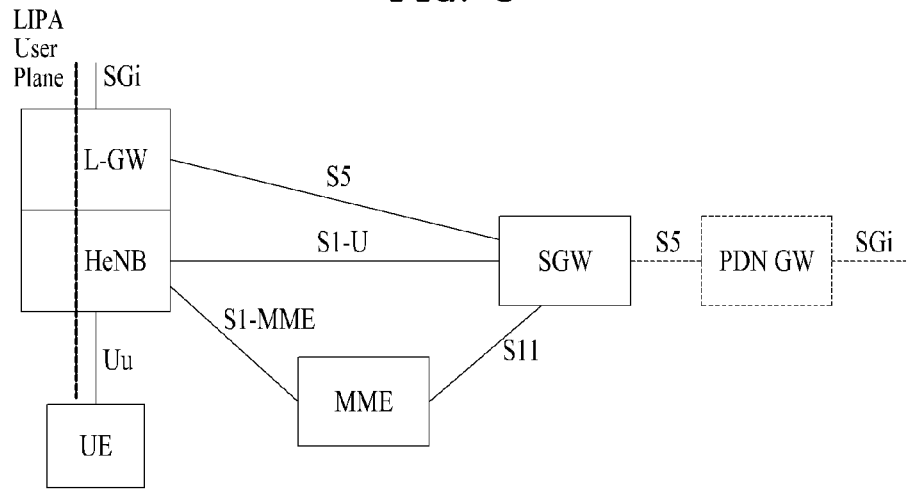
FIG. 3 is a view illustrating exemplary Local IP Access (LIPA) architectures.
Figure 3:
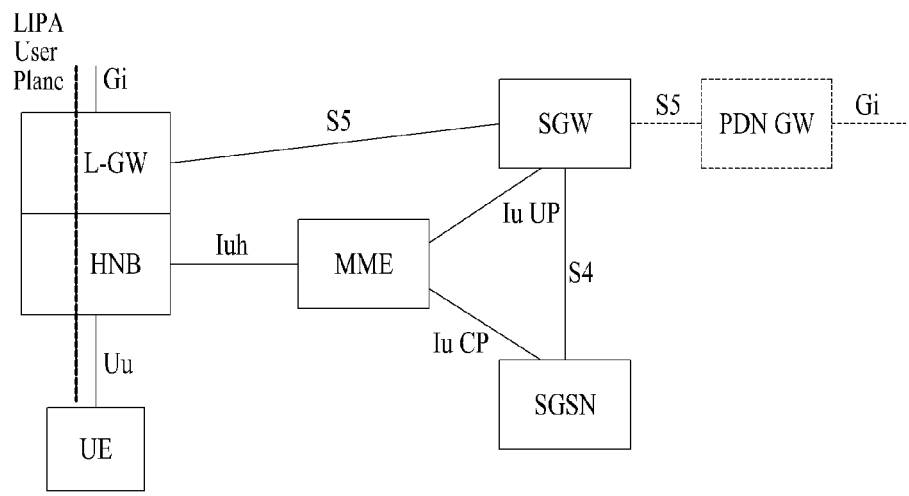
Figure 3:
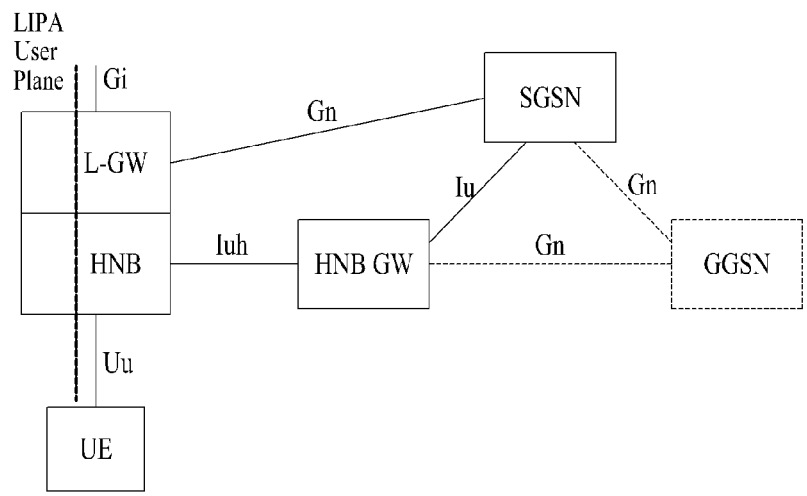

FIG. 3 is a view illustrating exemplary LIPA architectures.

FIGS. 3(*a*) to 3(*c*) correspond to examples of the H(e)NB subsystem architecture for LIPA defined in 3GPP Rel-10. Here, the LIPA architecture defined in 3GPP Rel-10 is restricted to a case in which a H(e)NB and a Local-GateWay (LGW) are co-located. However, this is merely an example and the principle of the present invention is also applicable to a case in which the H(e)NB and the LGW are located separately.

FIG. 3(*a*) illustrates a LIPA architecture for a HeNB using a local PDN connection. Although not shown in FIG. 3(*a*), a HeNB subsystem may include a HeNB and may optionally include a HeNB and/or an LGW. A LIPA function may be performed using the LGW co-located with the HeNB. The HeNB subsystem may be connected to an MME and an SGW of an EPC through an S1 interface. When LIPA is activated, the LGW has an S5 interface with the SGW. The LGW is a gateway toward an IP network (e.g., residential/enterprise network) associated with the HeNB, and may perform PDN GW functions such as UE IP address assignment, Dynamic Host Configuration Protocol (DHCP) function and packet screening. In the LIPA architecture, a control plane is configured using an EPC but a user plane is configured within a local network.

FIGS. 3(*b*) and 3(*c*) illustrate architectures of an HNB subsystem including an HNB and an HNB GW, and a LIPA function may be performed using an LGW co-located with the HNB. FIG. 3(*b*) illustrates an example of a case in which the HNB is connected to an EPC and FIG. 3(*c*) illustrates an example of a case in which the HNB is connected to an SGSN. For details of the LIPA architectures of FIG. 3, reference can be made to 3GPP TS 23.401 and TS 23.060.

PDN Connection

A PDN connection refers to a logical connection between a UE (specifically, an IP address of the UE) and a PDN. IP connectivity with a PDN for providing a specific service is required to receive the service in a 3GPP system.

3GPP provides multiple simultaneous PDN connections for access of a single UE simultaneously to multiple PDNs. An initial PDN may be configured depending on a default APN. The default APN generally corresponds to a default PDN of an operator, and designation of the default APN may be included in subscriber information stored in an HSS.

If a UE includes a specific APN in a PDN connection request message, access to a corresponding PDN is attempted. After one PDN connection is established, an additional specific PDN connection request message from the UE should always include the specific APN.

A few examples of IP PDN connectivity enabled by an EPS and defined in 3GPP Rel-10 are as described below (use of non-3GPP access is excluded).

The first example is a 3GPP PDN connection via an E-UTRAN. This is the most typical PDN connection in 3GPP.

The second example is a 3GPP PDN connection via a H(e)NB. Except for admission control for CSG membership due to adoption of a H(e)NB, the 3GPP PDN connection via a H(e)NB is established using a procedure similar to that of a PDN connection.

The third example is a LIPA PDN connection. The LIPA PDN connection is established through LIPA admission control depending on LIPA permission as well as admission control based on CSG membership via a H(e)NB.

A detailed description is now given of initial attach operations for the above three 3GPP PDN connections.

Figure 4:
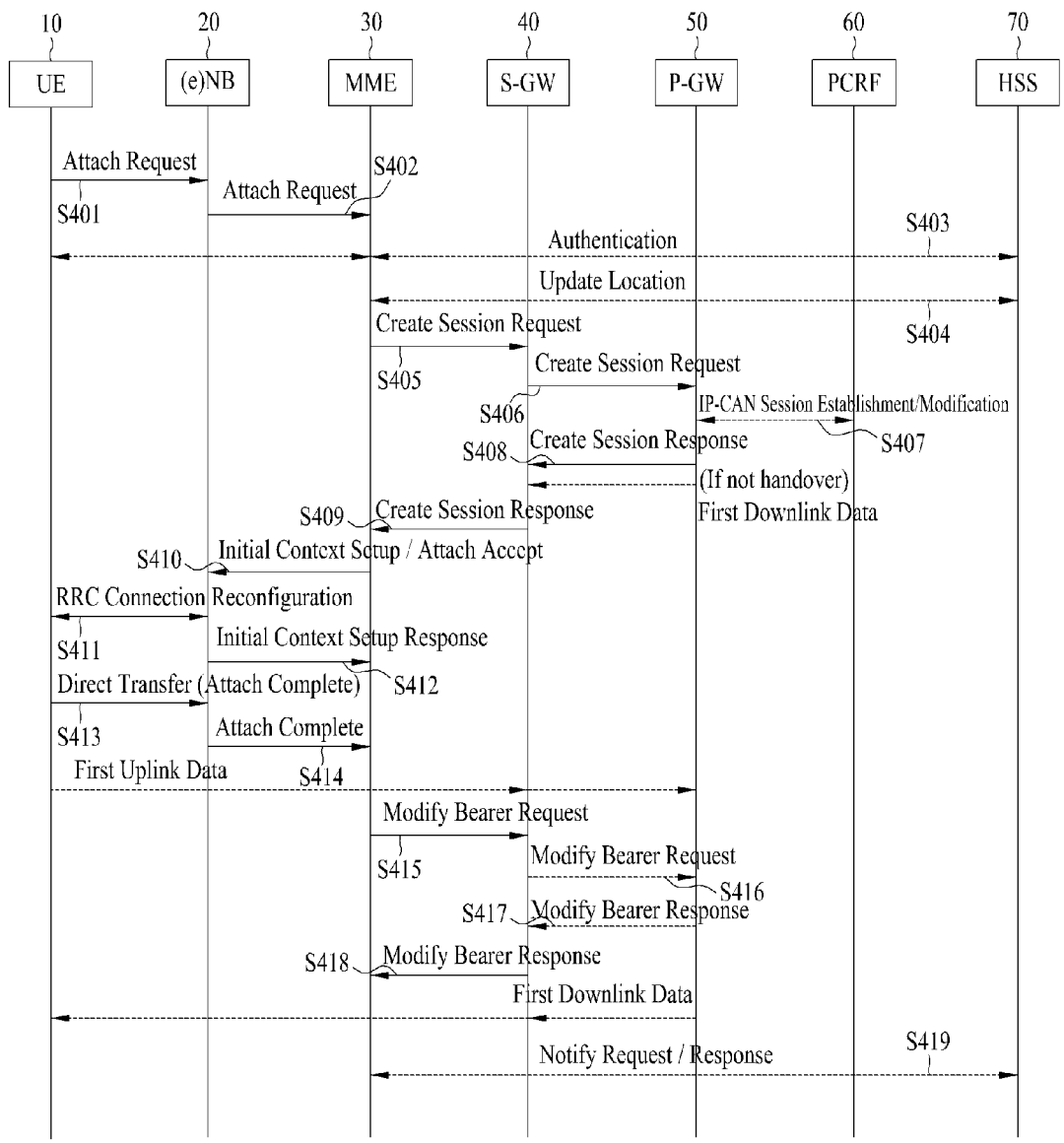
FIG. 4 is a flowchart for describing an initial attach operation for a $3^{rd}$ Generation Partnership Project (3GPP) Packet Data Network (PDN) connection via an Evolved-UMTS (Universal Mobile Telecommunication System) Terrestrial Radio Access Network (E-UTRAN)

FIG. 4 is a flowchart for describing an initial attach operation for a 3GPP PDN connection via an E-UTRAN.

In steps S401 and S402, a UE 10 may send an attach request message via an eNB 20 to an MME 30. In this case, the UE 10 may also send an APN of a PDN to which a connection is desired, together with the attach request.

In steps S403 and S404, the MME 30 may perform an authentication procedure on the UE 10, and register location information of the UE 10 in an HSS 70. In this operation, the HSS 70 may transmit subscriber information of the UE 10 to the MME 30.

In steps S405 to S409 (step S407 will be described separately), the MME 30 may send a create session request message to an S-GW 40 to establish an EPS default bearer. The S-GW 40 may send the create session request message to a P-GW 50.

The create session request message may include information such as International Mobile Subscriber Identity (IMSI), Mobile Subscriber Integrated Services Digital Network Number (MSISDN), MME Tunnel Endpoint ID (TEID) for Control Plane, Radio Access Technology (RAT) Type, PDN GW Address, PDN Address, Default EPS Bearer QoS, PDN Type, Subscribed Aggregate Maximum Bit Rate (APN-AMBR), APN, EPS Bearer ID, Protocol Configuration Options, Handover Indication, ME Identity, User Location Information (ECGI), UE Time Zone, User CSG Information, MS Info change Reporting Support Indication, Selection Mode, Charging Characteristics, Trace Reference, Trace Type, Trigger ID, Operation Management Controller (OMC) Identity, Max APN Restriction and Dual Address Bearer Flag.

In response to the create session request message, the P-GW 50 may send a create session response message to the S-GW 40, and the S-GW 40 may send the create session response to the MME 30. Through these operations, the S-GW 40 and the P-GW 50 may exchange TEIDs, and the MME 30 may recognize the TEIDs of the S-GW 40 and the P-GW 50.

As an optional procedure, in step S407, a Policy and Charging Rules Function (PCRF) interaction for operator policies may be performed between a Policy and Charging Enforcement Function (PCEF) of the P-GW 50 and a PCRF 60 as necessary. For example, establishment and/or modification of an IP-Connectivity Access Network (CAN) session may be performed. IP-CAN is a term which refers to one of a variety of IP-based access networks, e.g., 3GPP access network such as GPRS or EDGE, Wireless Local Area Network (WLAN) or Digital Subscriber Line (DSL) network.

In step S410, an attach accept message may be transmitted from the MME 30 to the eNB 20. Together with this message, the TEID of the S-GW 40 for UL data may also be transmitted. This message initiates radio resource setup in a RAN period (between the UE 10 and the eNB 20) by requesting initial context setup.

In step S411, Radio Resource Control (RRC) connection reconfiguration is performed. As such, radio resources of the RAN period are set up and a result thereof may be transmitted to the eNB 20.

In step S412, the eNB 20 may transmit an initial context setup response message to the MME 30. A result of radio bearer setup may also be transmitted together with this message.

In steps S413 and S414, an attach complete message may be sent from the UE 10 via the eNB 20 to the MME 30. In this case, the eNB 20 may also send a TEID of the eNB 20 for DL data together with this message. From this time, UL data may be transmitted via the eNB 20 to the S-GW 40 and the UE 10 may transmit UL data.

In steps S415 to S418, a modify bearer request message may be transmitted from the MME 30 to the S-GW 40 and this message may deliver the TEID of the eNB 20 for DL data to the S-GW 40. As optional operations, in steps S416 and S417, the bearer between the S-GW 40 and the P-GW 50 may be updated as necessary. After that, DL data may be transmitted via the eNB 20 to the UE 10.

As an optional operation, in step S419, if APN, ID of PDN GW, etc. should be stored in the HSS 70 to support mobility to a non-3GPP access network, the MME 30 may perform HSS registration using a notify request message and receive a notify response message from the HSS 70 as necessary.

Figure 5:
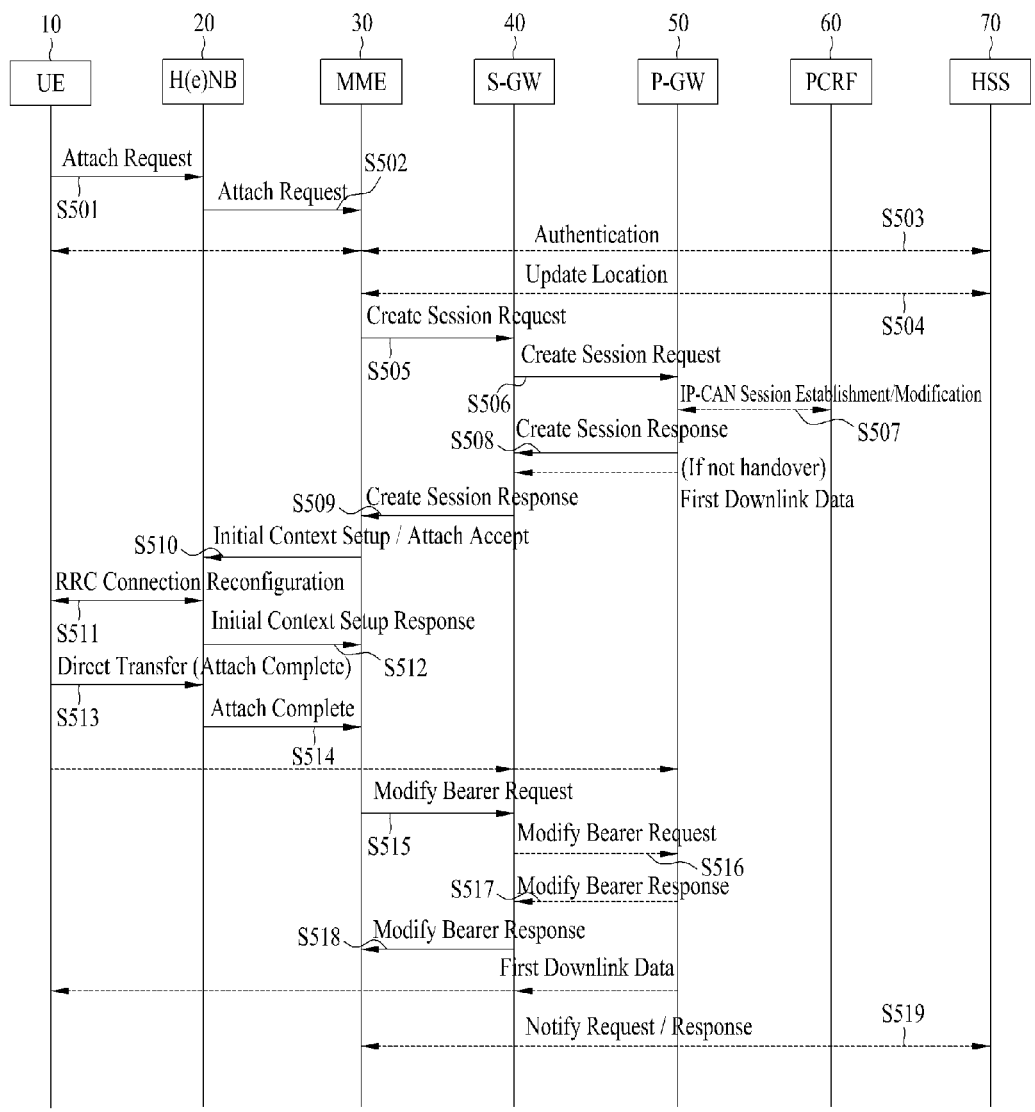
FIG. 5 is a flowchart for describing an initial attach operation for a 3GPP PDN connection via a Home (evolved) NodeB (H(e)NB)

FIG. 5 is a flowchart for describing an initial attach operation for a 3GPP PDN connection via a H(e)NB.

The EPS initial attach procedure via a H(e)NB of FIG. 5 is basically the same as the EPS initial attach procedure via an eNB described above in relation to FIG. 4. That is, if an eNB in the description of FIG. 4 is replaced with a H(e)NB in FIG. 5, the descriptions of steps S401 to S419 of FIG. 4 may be equally applied to steps S501 to S519 of FIG. 5. The following description will be given of only parts added in the EPS initial attach procedure via a H(e)NB of FIG. 5, and parts repeated from the description of FIG. 4 will be omitted here.

In steps S501 and S502, if the UE 10 accesses via a CSG cell, a H(e)NB 20 may transmit an attach request message to the MME 30 by adding a CSG ID and a HeNB access mode to information received from the UE 10. A closed access mode can be assumed when the H(e)NB 20 does not send information about the access mode.

In steps S503 and S504, subscriber information stored in the HSS 70 may also include CSG subscription information. The CSG subscription information may include information about a CSG ID and an expiration time. The CSG subscription information may be additionally provided from the HSS 70 to the MME 30.

In steps S505 to S509, the MME 30 may perform access control based on the CSG subscription information and the H(e)NB access mode and then send a create session request message to the S-GW 40 to establish an EPS default bearer.

In step S510, if the UE 10 accesses via a hybrid cell, CSG membership status of the UE 10 may be included in an attach accept message such that the H(e)NB 20 can differentially control the UE 10 based on the corresponding information. Here, the hybrid access is a mixed form of closed access and open access and the hybrid cell basically serves all users like open access but still has characteristics of a CSG cell. That is, a subscriber belonging to a CSG can be served with higher priority compared to other users and can be charged additionally. This hybrid cell can be clearly distinguished from a closed cell for not providing access of users not belonging to a CSG.

Figure 6:
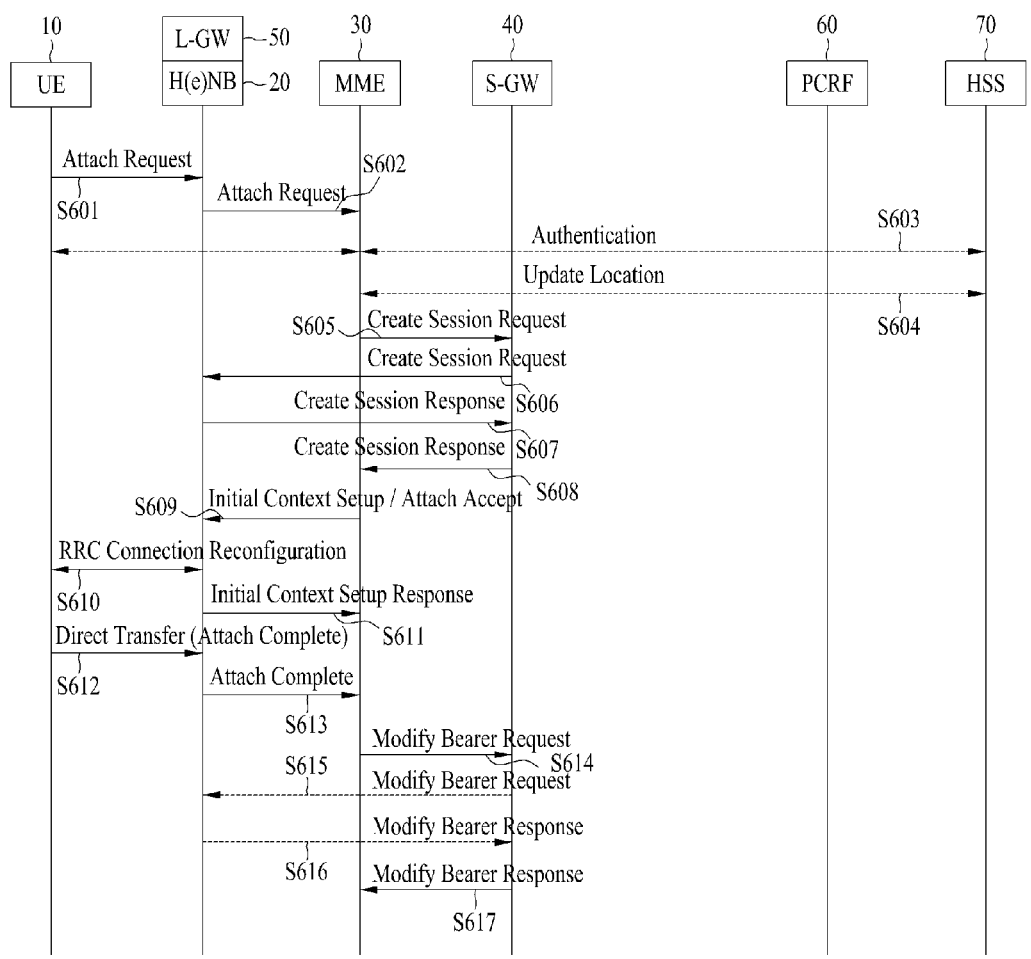
FIG. 6 is a flowchart for describing an initial attach operation for a LIPA PDN connection.

FIG. 6 is a flowchart for describing an initial attach operation for a LIPA PDN connection. Unlike FIGS. 4 and 5 illustrating EPS initial attach procedures, FIG. 6 corresponds to a LIPA initial attach procedure.

In steps S601 and S602, the UE 10 may send an attach request message via the H(e)NB 20 to the MME 30. In this case, the UE 10 may also send an APN of a PDN to which a connection is desired, together with the attach request. In the case of LIPA, a LIPA APN of a home based network may be sent as the APN. The H(e)NB 20 may transmit the attach request message to the MME 30 by adding a CSG ID, a HeNB access mode and an address of a co-located L-GW 50 to information received from the UE 10.

In steps S603 and S604, the MME 30 may perform an authentication procedure on the UE 10, and register location information of the UE 10 in the HSS 70. In this operation, the HSS 70 may transmit subscriber information of the UE 10 to the MME 30. The subscriber information stored in the HSS 70 may also include CSG subscription information and LIPA information. The CSG subscription information may include information about a CSG ID and an expiration time. The LIPA information may include indication information indicating whether LIPA is permitted to a corresponding PLMN and information about LIPA permission of a corresponding APN. As described above, LIPA permission may correspond to one of LIPA-prohibited, LIPA-only and LIPA-conditional. The CSG subscription information and the LIPA information may be additionally provided from the HSS 70 to the MME 30.

In steps S605 to S608, the MME 30 may perform evaluation for control of a CSG and a LIPA APN based on the CSG subscription information, the H(e)NB access mode and LIPA information. Evaluation may include CSG membership check, LIPA-permission check, etc. As a result of evaluation, if the UE 10 is permitted to access the LIPA APN via the H(e)NB 20, the MME 30 may send a create session request message to the S-GW 40 to establish an EPS default bearer. The S-GW 40 may send the create session request message to a P-GW. In the case of LIPA, the address of the L-GW 50 received from the H(e)NB 20 is used to select the P-GW. In response to this message, the P-GW (or the L-GW 50) may send a create session response message to the S-GW 40, and the S-GW 40 may send the create session response to the MME 30. Through these operations, the S-GW 40 and the P-GW (or the L-GW 50) may exchange TEIDs, and the MME 30 may recognize the TEIDs of the S-GW 40 and the P-GW (or the L-GW 50). In addition, the LIPA APN information may also be transmitted to the MME 30 together with the create session response message.

In the case of LIPA APN of LIPA-conditional, if the MME 30 has received information (e.g., address) about the L-GW 50 from the H(e)NB 20, a LIPA connection may be attempted. If the MME 30 has not received the information about the L-GW 50 from the H(e)NB 20, a P-GW selection function for a PDN connection may be performed.

In step S609, an attach accept message may be transmitted from the MME 30 to the H(e)NB 20. This message initiates radio resource setup in a RAN period (between the UE 10 and the H(e)NB 20) by requesting initial context setup. In this case, the above-described PDN connection type can indicate LIPA, and correlation ID information for a user plane direct link path between the H(e)NB 20 and the L-GW 50 may also be transmitted together with the attach accept message. The correlation ID corresponds to an ID of the L-GW 50, and a TEID of the P-GW may be provided as the ID of the L-GW 50 if the L-GW 50 serves as the P-GW.

In step S610, RRC connection reconfiguration is performed. As such, radio resources of the RAN period are set up and a result thereof may be transmitted to the H(e)NB 20.

In step S611, the H(e)NB 20 may transmit an initial context setup response message to the MME 30. A result of radio bearer setup may also be transmitted together with this message.

In steps S612 and S613, an attach complete message may be sent from the UE 10 via the H(e)NB 20 to the MME 30. In this case, the H(e)NB 20 may also send a TEID of the H(e)NB 20 for DL data together with this message.

In steps S614 to S617, a modify bearer request message may be transmitted from the MME 30 to the S-GW 40 and this message may deliver the TEID of the H(e)NB 20 for DL data to the S-GW 40. As optional operations, in steps S615 and S616, the bearer between the S-GW 40 and the P-GW (or the L-GW 50) may be updated as necessary.

Figure 7:
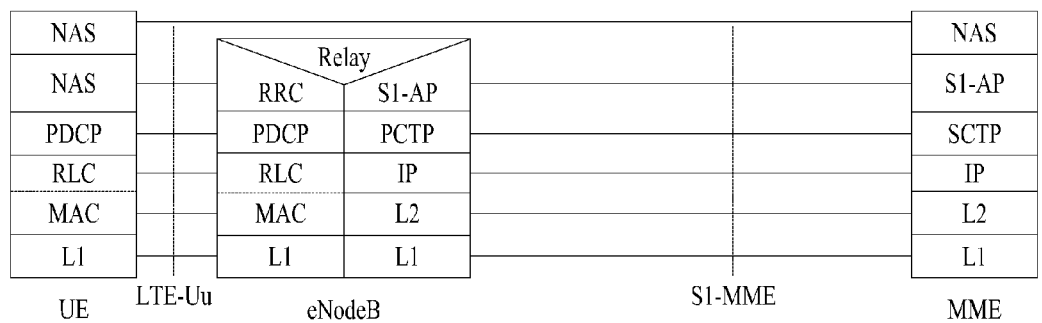
FIG. 7 is a view illustrating a control plane for interfaces among a User Equipment (UE), an evolved NodeB (eNB) and a Mobility Management Entity (MME)

FIG. 7 is a view illustrating a control plane for interfaces among a UE, an eNB and an MME.

The MME may perform access control on the UE that attempts access, and interfaces and protocol stacks used therefor are as illustrated in FIG. 7. The interfaces illustrated in FIG. 7 correspond to those among the UE, the eNB and the MME in FIG. 2. Specifically, a control plane interface between the UE and the eNB is defined as LTE-Uu, and a control plane interface between the eNB and the MME is defined as S1-MME. For example, an attach request/response message between the eNB and the MME may be transmitted and received via the S1-MME interface using an S1-AP protocol.

Figure 8:
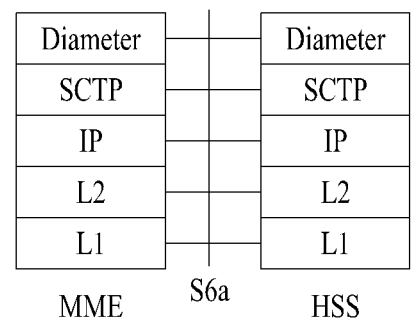
FIG. 8 is a view illustrating a control plane for an interface between an MME and a Home Subscriber Server (HSS)

FIG. 8 is a view illustrating a control plane for an interface between an MME and an HSS.

A control plane interface between the MME and the HSS is defined as S6a. The interface illustrated in FIG. 8 corresponds to that between the MME and the HSS in FIG. 2. For example, the MME may receive subscription information from the HSS via the S6a interface using a Diameter protocol.

Figure 9:
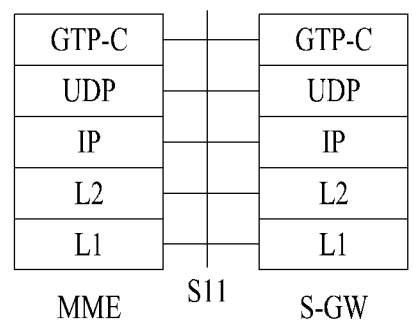
FIG. 9 is a view illustrating a control plane for interfaces among an MME, a Serving-Gateway (S-GW) and a Packet Data Network-Gateway (P-GW)
Figure 9:
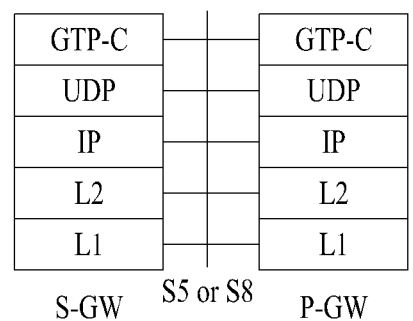

FIG. 9 is a view illustrating a control plane for interfaces among an MME, an S-GW and a P-GW.

A control plane interface between the MME and the S-GW is defined as S11 (FIG. 9(a)), and a control plane interface between the S-GW and the P-GW is defined as S5 (when not roamed) or S8 (when roamed) (FIG. 9(b)). The interfaces illustrated in FIG. 9 correspond to those among the MME, the S-GW and the P-GW in FIG. 2. For example, a request/response message for EPC bearer setup (or GTP (GPRS Tunneling Protocol) tunnel establishment) between the MME and the S-GW may be transmitted and received via the S11 interface using a GTP or GTPv2 protocol. In addition, a request/response message for bearer setup between the S-GW and the P-GW may be transmitted and received via the S5 or S8 interface using a GTPv2 protocol. The GTP-C protocol illustrated in FIG. 9 refers to a GTP protocol for a control plane.

A description is now given of bearer establishment and QoS, policy and, more particularly, an Aggregate Maximum Bit Rate (AMBR) application method of a legacy 3GPP system with reference to FIG. 4. The following description will be given of only QoS and policy of an initial access procedure, and reference can be made to the description of FIG. 4 for parts not described here. In this case, the AMBR includes an APN-AMBR and a UE-AMBR, where the APN-AMBR refers to a total bit rate permitted for all non-GBR bearers associated with a specific APN and the UE-AMBR refers to a total bit rate permitted for all non-GBR bearers of a UE. The APN-AMBR for UL data is enforced by an eNB and a PDN-GW, and the APN-AMBR for DL data is enforced by a PDN-GW. The UE-AMBR for UL/DL data is enforced by an eNB.

In step S404 of FIG. 4, location information is registered in the HSS. In this operation, the HSS transmits subscriber information of a corresponding UE to the MME. The subscriber information stored in the HSS includes QoS-related values such as APN-AMBR and UE-AMBR.

In steps S405 to S409, the MME sends a create session request message to the S-GW to establish an EPS default bearer. The S-GW sends the create session request message to the P-GW. Through these operations, the S-GW and the P-GW exchanges TEIDs, and the MME recognizes the TEIDs of the S-GW/P-GW. The create session request message also includes APN-AMBR information. The P-GW transmits an ultimately determined APN-AMBR value to the S-GW in a create session response, and this information is transmitted to the MME.

In step S407, PCRF interaction for operator policies is performed between the P-GW and the PCRF as necessary. The PCRF may modify and transmit the APN-AMBR value to the P-GW as necessary.

In step S410, an attach accept message is transmitted to the eNB. At this time, the attach accept message includes the TEID of the S-GW for UL data. In addition, this message initiates radio resource setup in a RAN period. In this case, the MME determines a UE-AMBR value to be used by the eNB and sends the determined value in the attach accept message.

As described above, a UE configures an EPS bearer using QoS parameters such as APN-AMBR and UE-AMBR values determined based on subscriber information and operator policies. That is, a Maximum Bit Rate (MBR) for a non-GBR bearer is managed per APN to be accessed by a UE, or per UE. However, this MBR management scheme on an individual UE basis may be inefficient in an MTC service environment.

For example, when UEs are added to or deleted from an arbitrary group, a total MBR usable by the group should be changed. In this case, if management is not performed on a group basis, MBR values of all or a part of individual UEs belonging to the group should be updated. In this procedure, signaling of the whole system may be greatly increased network resources may be wasted.

Figure 10:
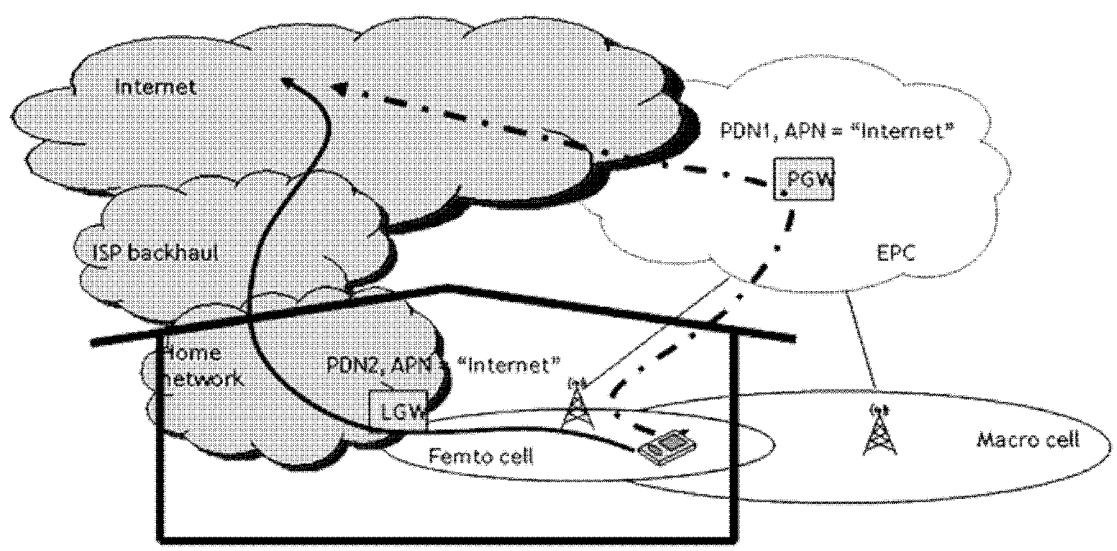
FIG. 10 is a view illustrating an exemplary network environment to which the present invention is applicable.

Conventional AMBR management does not consider how to manage an APN-AMBR value included in subscriber information of a UE when different connections (i.e., connections using different GWs) can be simultaneously established using the same APN as illustrated in FIG. 10. In other words, when some flows are served via PDN2 and some other flows are served via PDN1, one APN-AMBR value is designated per APN and two GWs serve as enforcement points. There is no consideration of APN-AMBR management in this case.

On the other hand, if MBR management is performed on a group basis, the size of MBR per individual UE may be increased by assigning an MBR of 30 to a group including UE1, UE2 and UE3 rather than assigning an MBR of 10 to each of UE1, UE2 and UE3. Alternatively, if an MBR of 20 is assigned to the group, since network resources may be shared, the efficiency of using resources may be increased in view of a network and a service fee per UE may be reduced in view of individual UEs.

A description is now given of a method for managing MBR on a group basis in an MTC service environment, according to embodiments of the present invention.

Before describing each embodiment, a description is now given of a group AMBR in the present invention.

A group AMBR mentioned in the present invention may refer to one of the following three. First, the group AMBR may refer to a 'per Group Aggregate Maximum Bit Rate' which is an AMBR expected to be provided to all PDN connections/all (non-) GBR bearers of UEs included in the same group. Second, the group AMBR may refer to a 'per APN per Group Aggregate Maximum Bit Rate' which is an AMBR expected to be provided to all PDN connections/all (non-) GBR bearers for a corresponding APN of UEs included in the same group. Third, the group AMBR may refer to a 'per Group per APN Aggregate Maximum Bit Rate' which is an AMBR expected to be provided to all PDN connections/all (non-) GBR bearers of UEs included in the same group per corresponding APN. However, the group AMBR is not limited to the above three and is modifiable or configurable depending on operator policies. In addition, the AMBR may cover both non-GBR bearers and GBR bearers.

The group AMBR may be used together with other QoS parameters and thus applied as a group based policy. That is, when subscriber information is received, group-AMBR information may also be received together with other QoS parameters.

A group-AMBR value may be used when group based policy enforcement is performed using QoS information exchanged in a bearer establishment procedure by a PDN-GW, an MME, an eNB, a UE, etc.

If a problem such as exceeding of the limit of an AMBR occurs when group based policy enforcement is performed, a network may transmit an appropriate message or request QoS value adjustment to UEs or all groups to which the UEs belong. In addition, the UEs may also request QoS value adjustment to the network as necessary. Here, QoS value adjustment includes all updates of the QoS value, e.g., addition, deletion, increase and reduction.

A policy executing node such as a PCRF or a control node such as an MME may update the QoS value depending on pre-configured information, HPLMN/VPLMN and the intention of a local operator. The group-AMBR may also be updated based on the QoS value update procedure.

The group-AMBR parameter is not limited to a single parameter but may be defined as a plurality of parameters. Network nodes for performing actual enforcement of group based policies using the parameters may be defined as the same network node or a plurality of different network nodes.

Embodiment 1

Embodiment 1 relates to descriptions of and/or procedures for configuration of a group AMBR/an APN AMBR usable by each group, enforcement of the group AMBR, and updating of the group AMBR. Although a network node for configuring/enforcing/updating the group AMBR is a PGW in the following description, the network node is not limited thereto and may be another network node such as an SGW.

To perform Group_AMBR enforcement, a PGW needs to check whether a UE associated with user plane data currently passing the PGW is an MTC UE or to which group the UE belongs. This information may be acquired by an MME based on subscriber information and then transmitted to the P-GW. Alternatively, this information may be acquired based on information pre-configured in the P-GW. Otherwise, this information may be acquired through interaction with a PCRF or a third group management node.

Figure 11:
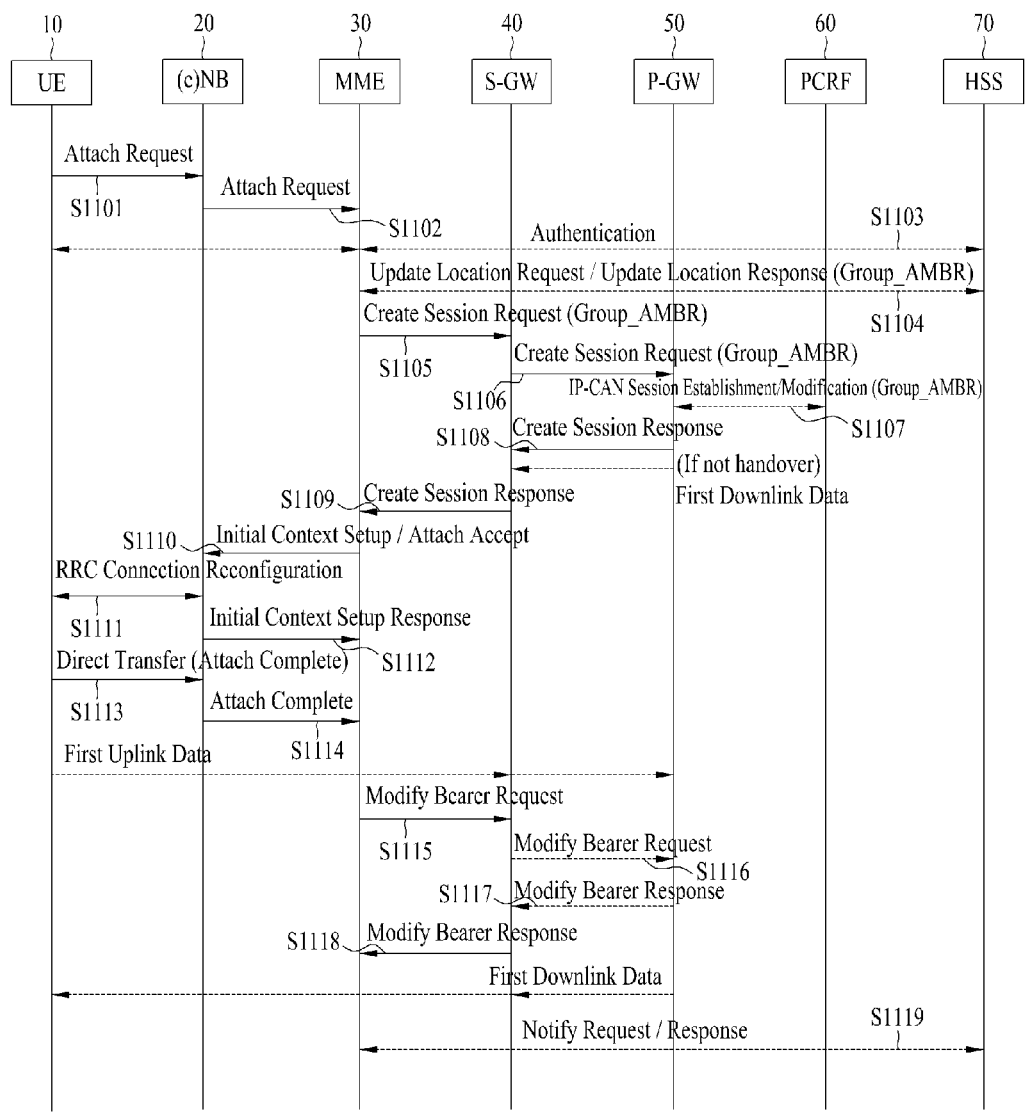
FIG. 11 is a view for describing embodiments of the present invention.

If the UE is an (MTC) UE belonging to a group, on which Group_AMBR enforcement needs to be performed, the PGW may check a Group_AMBR value. The Group_AMBR value may be checked in steps S1104 to S1107 of an initial attach procedure illustrated in FIG. 11. That is, the Group_AMBR value may be acquired by the MME based on the subscriber information of an HSS or from the third group management node and then transmitted via an S-GW to the P-GW. Alternatively, the Group_AMBR value may be acquired based on the information pre-configured in the P-GW. Otherwise, the Group_AMBR value may be acquired from the PCRF or the third group management node in step S1107 of FIG. 11.

Group_AMBR enforcement may be an operation for calculating a statistical value per group by checking a user plane data rate passing the P-GW, and checking whether the statistical value exceeds the Group_AMBR value. If the above calculated statistical value exceeds the Group_AMBR value, packet drop may be performed based on pre-configured policies.

The PGW may transmit appropriate information about an event which occurs during Group_AMBR enforcement, to another network node such as the MME or the PCRF. If an indication about QoS updating is received from the network node, the PGW may perform a related procedure. Alternatively, QoS updating may be directly initialized/initiated by the PGW. Here, QoS updating may be performed as described below.

QoS updating may be an operation for adjusting Group_AMBR. When the number of UEs belonging to an arbitrary group (e.g., an MTC group to which UEs belong) is changed (e.g., UEs are added), a total MBR usable by the group should be changed. If Group_AMBR is adjusted as described above, a procedure for updating an MBR value of each individual UE may not be inevitably needed.

Some UEs can be influenced by the changed Group_AMBR value but the influence is merely partial. When UEs are added to or deleted from a group by a value equal to or less than an arbitrary threshold, the Group_AMBR value may be managed irrespective of the number of UEs belonging to the group.

Load balancing may be selectively performed among the UEs based on the Group_AMBR value.

If the change in number of UEs of the group is less than a pre-configured value, the Group_AMBR value may be constantly maintained.

Embodiment 2

Embodiment 2 relates to a case in which a Group_APN_AMBR is configured to be shared among a plurality of groups. The descriptions of Embodiment 1 are basically applied to Embodiment 2 and Embodiment 2 is characterized in that QoS updating is performed per group.

That is, if a Group_APN_AMBR shared by group A and group B is exceeded, QoS of UEs belonging to group A only may be updated. Here, a group for QoS updating may be determined based on operator policies, group subscription information, etc.

Embodiment 3

When there are a plurality of GWs for Group_AMBR enforcement, a plurality of virtual groups for the GWs may be configured in a group. Each P-GW may perform enforcement on a virtual group and a plurality of virtual groups may dynamically share a single Group_AMBR. Here, the virtual groups may be managed by the MME, the HSS, the PCRF or a third group management server.

In this case, the PGW may check to which group a UE belongs, check a Group_AMBR value, and then perform Group_AMBR enforcement. Here, the P-GW may not know the presence of the virtual groups and/or the Group_AMBR values of the virtual groups. If the P-GW knows the presence of the virtual groups and actively exchanges information with a P-GW for performing enforcement on another virtual group or another group management network node, the P-GW may store information about the corresponding network node and the virtual groups. Reports among virtual group management network nodes should be performed dynamically, and adjustment of the Group_AMBR values of the virtual groups may be considered when QoS updating is performed. Alternatively, sessions of some UEs of a group which exceeds a virtual Group_AMBR value may be moved to another virtual group, i.e., to be connected to another P-GW, through P-GW reassignment or the like.

Embodiment 4

Embodiment 4 provides detailed descriptions of application of Group_AMBR descriptions to SIPTO@LN.

A Group_APN-AMBR value to be inevitably used for SIPTO@LN per APN during SIPTO@LN permission of subscriber information may be previously designated (irrespective of whether two or more connections are established). That is, the subscriber information has a Group_APN-AMBR value of a whole group and the Group_APN-AMBR value can be dynamically adjusted as if two virtual groups are present. This value may be changed statically or dynamically by an operator. For example, this value may be changed upon a request of a UE/user or depending on network capability.

When an SIPTO@LN connection is established using the same APN, if the P-GW has another connection, the MME and the P-GW should be able to recognize through which indication the SIPTO@LN connection is established. The P-GW adjusts the APN-AMBR value to be used for enforcement, based on this information. On the other hand, when the SIPTO@LN connection is released, the MME and the P-GW recognize this and the P-GW adjusts the APN-AMBR value to be used for enforcement. The adjustment procedure may include interaction with a network node which is in charge of policies, e.g., PCRF.

An APN-AMBR value usable for SIPTO@LN to be used when two or more connections are established per APN during SIPTO@LN permission of subscriber information may be previously designated. That is, a value usable by each virtual group is previously designated in consideration of two virtual groups. The previously designated value may also be adjusted dynamically. This value may be changed statically or dynamically by an operator. This value may be changed upon a request of a UE or depending on network capability.

When an SIPTO@LN connection is established using the same APN, if the P-GW has another connection, the MME and the P-GW should be able to recognize through which indication the SIPTO@LN connection is established. The P-GW adjusts the APN-AMBR value to be used for enforcement, based on this information. On the other hand, when the SIPTO@LN connection is released, the MME and the P-GW recognize this and the P-GW adjusts the APN-AMBR value to be used for enforcement. The adjustment procedure may include interaction with a network node which is in charge of policies, e.g., PCRF.

APN-AMBR enforcement may be dynamically performed through interaction among network nodes such as the MME, the P-GW, the L-GW, the PCRF and a third server. The MME may recognize that two PDN connections are currently established to the P-GW and the L-GW, and request a periodical report for enforcement to each GW. Alternatively, the MME may request and acquire a value of current APN-AMBR enforcement status at a certain point of time. The MME may check the statuses of the two connections to report an APN-AMBR value usable by each connection depending on priority based on a UE/user request or preference, subscriber information, operator policies, a local network environment, etc., or to initialize/initiate a procedure for changing the connection for some flows.

A network node which is in charge of policies, e.g., PCRF, may acquire information about an APN-AMBR value currently used by each connection (upon a request or through a periodical report) and then report an APN-AMBR value usable by each connection depending on priority based on a UE/user request or preference, subscriber information, operator policies, a local network environment, etc., or initialize/initiate a procedure for changing the connection for some flows.

The MME, the PCRF, another GW or a third network node may mainly perform dynamic APN-AMBR management, or may interact with a network node which is in charge of policies of a local network or a network node having policies of a H(e)NB owner.

Figure 12:
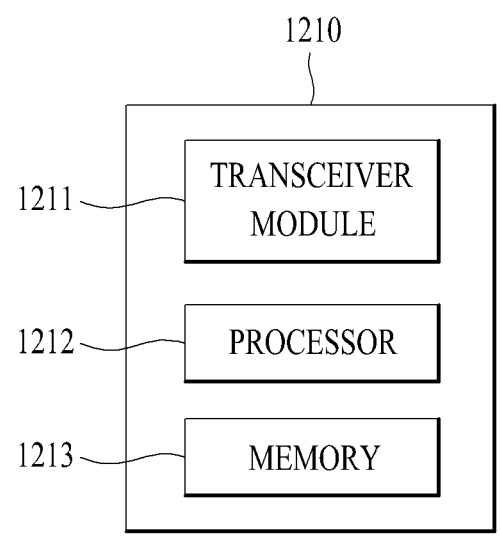
FIG. 12 is a block diagram of a network node apparatus according to an embodiment of the present invention.

FIG. 12 is a block diagram of a network node apparatus according to an embodiment of the present invention.

Referring to FIG. 12, a P-GW device 1210 according to an embodiment of the present invention may include a transceiver module 1211, a processor 1212 and a memory 1213. The transceiver module 1211 may be configured to transmit and receive a variety of signals, data and information to and from an external device (e.g., a network node (not shown) and/or a server device (not shown)). The processor 1212 may be configured to provide overall control to the P-GW device 1210 and to process information to be transmitted to or received from the external device. The memory 1213 may store the processed information for a predetermined time and is replaceable by another component such as a buffer (not shown).

The processor 1212 of the P-GW device 1210 may perform processes required to implement the above-described embodiments.

The P-GW device 1210 may be configured in such a manner that the above-described embodiments of the present invention are implemented independently or two or more embodiments are combined. Redundant descriptions are not given here for clarity.

The above-described embodiments of the present invention may be implemented by various means, for example, hardware, firmware, software, or a combination thereof.

In a hardware configuration, the methods according to embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to embodiments of the present invention may be implemented in the form of a module, a procedure, a function, etc. performing the above-described functions or operations. Software code may be stored in a memory unit and executed by a processor. The memory unit may be located inside or outside the processor and exchange data with the processor via various known means.

The detailed descriptions of the preferred embodiments of the present invention have been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The above-mentioned embodiments of the present invention are applicable to a variety of mobile communication systems.

The invention claimed is:

1. A method for managing Quality of Service (QoS) of a network node in a wireless communication system, the method comprising
    checking a Maximum Bit Rate (MBR) of user plane data configured for each of one or more User Equipments belonging to a Machine Type Communication (MTC) group;
    calculating a total MBR of the MTC group comprising the one or more User Equipments; and
    when the calculated total MBR is greater than a group Aggregated MBR (AMBR) configured for the MTC group, determining whether to update the group AMBR based on a change in a number of the one or more User Equipments of the MTC group,
    wherein the determining comprises:
        if the change is equal to or greater than predetermined value, updating the group AMBR equal to the calculated total MBR; and
        if the change is less than the predetermined value, updating the MBR for at least one User Equipment in the MTC group, and
    wherein the total MBR for the MTC group calculated based on the updated MBR is equal to the group AMBR.

2. The method according to claim 1, wherein the group AMBR is received from a Mobility Management Entity (MME), pre-configured in the network node, or received from a Policy and Charging Rules Function (PCRF).

3. The method according to claim 1, wherein, if the network node is for one of two paths for the user plane data, the group AMBR is one of two virtual group AMBRs for the group AMBR of subscriber information.

4. The method according to claim 3, wherein the two paths comprise a path for a Selected IP Traffic Offload at Local Network (SIPTO@LN).

5. The method according to claim 3, wherein the two virtual group AMBRs are pre-configured.

6. The method according to claim 1, wherein the group AMBR is an AMBR for all Packet Data Network (PDN) connections of UEs belonging to the MTC group.

7. The method according to claim 1, wherein the network node is a Packet data network GateWay (PGW).

8. A network node apparatus for managing a Maximum Bit Rate (MBR) in a wireless communication system, the network node apparatus comprising:
   a transceiver; and
   a processor configured to control the transceiver,
   wherein the processor is configured to:
      check an MBR of user plane data configured for each of User Equipments belonging to a Machine Type Communication (MTC) group,
      calculate a total MBR of the MTC group comprising the one or more User Equipments, and
      when the calculated total MBR is greater than a group Aggregated MBR (AMBR) configured for the MTC group, determine whether to update the group AMBR based on a change in a number of the one or more User Equipments of the MTC group,
   wherein, for the determining, the processor is further configured to:
      if the change is equal to or greater than predetermined value, update the group AMBR equal to the calculated total MBR, and
      if the change is less than the predetermined value, update the MBR for at least one User Equipment in the MTC group, wherein the total MBR for the MTC group calculated based on the updated MBR is equal to the group AMBR.

* * * * *